(12) United States Patent
Albach et al.

(10) Patent No.: US 7,141,613 B2
(45) Date of Patent: Nov. 28, 2006

(54) FLAME RESISTANT RIGID FOAMS AND FORMULATIONS FOR THE PRODUCTION THEREOF

(75) Inventors: Rolf Albach, Köln (DE); Michael Brockelt, Leverkusen (DE); Juan Cirujeda-Ranzenberger, Barcelona (ES)

(73) Assignee: Bayer Aktiengesellschaft, Leverkusen (DE)

( * ) Notice: Subject to any disclaimer, the term of this patent is extended or adjusted under 35 U.S.C. 154(b) by 501 days.

(21) Appl. No.: 10/384,882

(22) Filed: Mar. 10, 2003

(65) Prior Publication Data

US 2003/0225174 A1 Dec. 4, 2003

(30) Foreign Application Priority Data

Mar. 15, 2002 (DE) ................................ 102 12 117

(51) Int. Cl.
*C08G 18/28* (2006.01)
(52) U.S. Cl. ..................... 521/164; 521/131; 521/167; 521/170; 521/172; 521/173; 521/174; 252/182.24; 252/182.26
(58) Field of Classification Search ................ 521/164, 521/167–170, 172, 173, 174, 131; 252/182.24, 252/182.26
See application file for complete search history.

(56) References Cited

U.S. PATENT DOCUMENTS

| | | | | |
|---|---|---|---|---|
| 4,247,655 A | | 1/1981 | Dunleavy et al. ........... | 521/164 |
| 4,485,195 A | * | 11/1984 | Brennan et al. ............ | 521/167 |
| 4,489,178 A | | 12/1984 | Brennan et al. ............ | 521/167 |
| 5,451,615 A | | 9/1995 | Birch ........................ | 521/132 |
| 5,556,894 A | * | 9/1996 | Fishback et al. ............ | 521/168 |
| 6,281,393 B1 | * | 8/2001 | Molina et al. .............. | 568/607 |
| 6,495,722 B1 | * | 12/2002 | Zimmerman et al. ....... | 564/346 |

FOREIGN PATENT DOCUMENTS

GB  1002272  8/1965

OTHER PUBLICATIONS

DIN 22 719, Oct. 1993, Petroleum products and lubricants, See English language translation also enclosed.

* cited by examiner

*Primary Examiner*—John M. Cooney, Jr.
(74) *Attorney, Agent, or Firm*—Joseph C. Gil; Lyndanne M. Whalen

(57) ABSTRACT

The invention relates to flame resistant rigid foams and formulations useful for the production thereof. The polyol formulation must include at least one substance which is inert with respect to isocyanates, does not deplete the ozone layer and has a boiling point below 55° C. and a reaction product of at least one compound with an aromatic ring, at least one aldehyde or ketone and at least one primary or secondary amine. This polyol formulation is reacted with an isocyanate, optionally with other commonly used additives, to produce rigid flame resistant foams.

4 Claims, No Drawings

FLAME RESISTANT RIGID FOAMS AND FORMULATIONS FOR THE PRODUCTION THEREOF

BACKGROUND OF THE INVENTION

The invention relates to polyol formulations based on aromatic aminopolyols and to the flame-resistant rigid foams produced therefrom.

Isocyanate-based foams are widely used for the insulation of buildings, parts of buildings, pipes, containers and many other things against the loss of coldness or heat, and also for the reinforcement of components. It should be remembered that insulating materials of this type must have specific properties when exposed to a flame, particularly when they are used in the construction industry. These properties vary from country to country. In the Federal Republic of Germany, the flame propagation characteristic determined in accordance with DIN 4102 is crucial. To achieve particularly good insulating effect, chlorofluorocarbons and chlorofluorohydrocarbons are still widely used as physical blowing agents. However, it has been found that these materials can probably represent a considerable risk for the essential atmospheric ozone layer. A challenge for industrial progress is to provide foams in which these materials are no longer necessary.

One method which is already being widely adopted is the exclusive use of water as a blowing agent. The fact that the carbon dioxide formed from water and isocyanates and acting as a blowing agent leaves the foam cells more quickly than air enters those cells subjects the foam to considerable stress. This necessitates increased pressure resistance and therefore usually undesirably increased densities in the foam. The use of other chemical blowing agents such a carbamates or carboxylic acids has the same drawback. The use of formic acid or formates can also lead to the emission of toxic carbon monoxide.

Fluorinated hydrocarbons are alternative blowing agents. R134a is widely used and, due to its gaseous state at ambient temperature and its low solubility in the conventional components used to produce isocyanate-based foams, leads to considerable handling problems and to a minimal improvement over purely water-blown foams. Other fluorinated hydrocarbons are characterized by sometimes expensive production processes. Mixtures of these blowing agents with polyols can have a flashpoint below 55° C. so they can be handled only after taking safety precautions.

The use of tert.butanol for the production of integral-skin foams with a solid outer skin is known. Tert.butanol as a blowing agent has the drawback that the reaction temperature required to release the blowing agent is not attained or is attained too late in outer regions and on cold surfaces and the low density desired for the insulating effect cannot be obtained. This is particularly important in outdoor applications where the foam is applied to the often cold and unheatable component to be insulated. Tert.butanol is also flammable at low temperatures; furthermore, the addition of tert.butanol can lead to a polyol flash point below 55° C.

Due to their favorable cost, alkanes are widely used as blowing agents. These products also have the drawback of flammability which, on the one hand, necessitates safety precautions in processing and, on the other hand, leads to less desirable behavior in various standardized flammability tests. This can be compensated for, in part, by addition of relatively large quantities of flame retardants to the foams. Frequently, however, this adversely affects other properties of the foam.

BE-A 680691 discloses the use of Mannich bases in conjunction with chlorinated, ozone-destroying blowing agents and without the use of polyester polyols for the production of polyurethane rigid foams. In that case, however, it is preferable to use alkoxylated Mannich bases as raw materials for the production of such foams. The use of alkoxylated Mannich bases in conjunction with polyester polyols and ozone-depleting blowing agents is known, for example, from U.S. Pat. No. 5,451,615. However, alkoxylated Mannich bases are more expensive to produce due to the additional required step of alkoxylation. U.S. Pat. No. 4,489,178 discloses the production of rigid polyurethane foams with improved flame retardance whereby alkoxylated Mannich bases form the polyol component.

EP-B 0 854 159 discloses a process for the production of rigid polyurethane foams which develop little smoke in case of fire.

SUMMARY OF THE INVENTION

It has been found that, when using non-alkoxylated Mannich bases, even if the polyol formulation used has a flash point below 55° C., polyurethane foams may be obtained which exhibit more favorable flame propagation than polyurethane foams produced using Mannich polyols (i.e. alkoxylated Mannich bases) or polyols based on aromatic amines which are currently used, for example, in formulations for spray-on foam. The activity is higher and optionally allows the use of amine catalysts to be reduced. Surprisingly, better compatibility between the blowing agent and the other polyol components can also be achieved than when using alkoxylated aromatic amine and alkoxylated Mannich bases.

DETAILED DESCRIPTION OF THE INVENTION

The invention relates to polyurethane rigid foams produced by reacting a) an isocyanate group-containing component, preferably polyisocyanates or prepolymers based on MDI or TDI, more preferably polymeric MDI, in particular polymeric MDI having a viscosity of 80 to 1,200 mPa.s (25° C.), with b) a component having a flash point (according to DIN EN 22719) below 55° C., including:

b1) one or more substances which are inert toward isocyanates and do not have an ozone-destroying effect, with a boiling point below 100° C., preferably below 50° C., e.g., $C_3$–$C_6$ alkanes such as propane, butane, isobutane, iso- or n-pentane, cyclopentane, isohexane, $C_1$–$C_4$ alcohols or combustible fluorine hydrocarbons such as R 152a or R 365mfc and mixtures thereof with incombustible blowing agents, more preferably $C_5$ alkanes or $C_5$ alkanes mixed with $C_2$–$C_4$ fluorine hydrocarbons;

b2) a reaction product of one or more compounds with an aromatic ring, preferably a phenol or phenolic ether or a phenol substituted in the meta- or para-position, the substituent preferably being an alkyl or aryl substituent and one or more aldehydes and/or ketones, preferably formaldehyde, and one or more primary or secondary amines, preferably ethanol amine, diethanol amine, propanol amine, dipropanol amine, methyl ethanol amine or methyl propanol amine, the hydroxyl value of the reaction product preferably being 300 to 800; and optionally, b3) one or more isocyanate-reactive components which contain a polyester group, preferably aromatic polyester polyols with a hydroxyl value of from 100 to 500, in particular 120 to 350; and optionally, b4) one or more compounds which are capable of reacting with an isocyanate and do not correspond to components b2 or b3, preferably polyalkylene glycols based on propylene glycol, ethylene glycol, glycerine, trimethylol propane, pentaerythritol, neopentyl glycol or brominated derivates thereof, dibromo butene diol, bisphenol A, bisphenol F, sucrose or other sugars, sorbitol or other hydrogenated sugars, toluene diamine, diphenylmethane diamine ("MDA"), ethylene diamine, ammonia, alkanol amines or alkylalkanol amines; and optionally, b5) one or more additives required for the production of foams, for example foam stabilizers, catalysts, emulsifiers, water, flame retardants, decelerators, diluents, etc.

In preferred embodiments of the invention, an alkane or a mixture of an alkane with a fluorinated hydrocarbon is used as component b1; a Mannich base based on alkyl phenol, dialkanol amine and formaldehyde is used as component b2; an aromatic polyester polyol based on terephthalic acid or phthalic acid/diethylene glycol is used as component b3; and optionally, a smaller quantity of $C_4$–$C_6$ dicarboxylic acid and glycerine or TMP.

Component b preferably includes from about 0.5 to about 40% by weight, more preferably 3 to 20% by weight of component b1, from about 5 to about 70% by weight, more preferably 10 to 30% by weight of component b2, from about 5 to bout 80% by weight, more preferably 10 to 60% by weight of component b3, and from 0 to about 60% by weight, more preferably 0 to 25% by weight of component b4.

When reacting components a and b, an index (ratio of isocyanate groups to groups capable of reacting with isocyanate, multiplied by a factor of 100) of 100 to 500 is preferably adhered to, more preferably 100 to 140, and most preferably, 175 to 350. When producing the polyurethane rigid foams of the present invention, the blowing agent b1 is either introduced in a mixture with the other constituents of component b or, in the case of foaming in or prior to the mixer unit, is mixed into polyol or isocyanate component, preferably into the polyol component, using a suitable unit, for example a stirrer or static mixer.

Having thus described the invention, the following Examples are given as being illustrative thereof.

EXAMPLES

Production of the Mannich Bases p-onylphenol and diethanol amine were heated together to 313 K. The specified quantities of a 31.9% aqueous solution of formaldehyde were added within 20 minutes. The temperature of the mixture was kept at 313 K for 1 hour. The mixture was then heated to 353 K for 3 hours. After cooling to 60° C., the mixture was dewatered under reduced pressure (1 to 4 mbar). The product was finally diluted to the desired hydroxyl value. A conventional commercial polyether polyol initiated with trimethylol propane and having a hydroxyl value of 250 (Desmophen® TP.PU 1657, Bayer AG) and/or TCPP (Levagard® PP, Bayer AG) were used for dilution purposes. The products obtained were characterized via the content of anhydride-reactive groups (hydroxyl value), the nitrogen content (Kjelldahl method), the water content according to Karl Fischer, the pH and the viscosity at 298 K.

| Mannich base | BM1 | BM2 | BM3 | BM4 | BM5 | BM6 |
|---|---|---|---|---|---|---|
| Nonylphenol [kg] | 2.2 | 1.65 | 1.0 | 1.1 | 1.0 | 1.1 |
| Diethanolamine [kg] | 1.575 | 1.38 | 0.83 | 0.79 | 0.83 | 0.79 |
| Formaline, 31.9% [kg] | 1.41 | 1.31 | 0.75 | 0.705 | 0.75 | 0.705 |
| Desmophen ® TP.PU 1657 [kg] | | | 0.64 | 0.66 | | |
| Levagard ® PP [kg] | | | | | 0.64 | 0.66 |
| Hydroxyl value (PSA) | 608 | 606 | 551 | 525 | 467 | 442 |
| pH value | | | 10.2 | 10.3 | 9.8 | 9.8 |
| Water content [% by weight] | 0.02 | 0.01 | 0.01 | 0.01 | 0.03 | 0.04 |
| Nitrogen content [% by weight] | 5.2 | 5.6 | 4.2 | 3.9 | 4.3 | 3.9 |
| Viscosity (298 K) [Pa · s] | 15.5 | 8.4 | 3.1 | 3.6 | 2.4 | 2.9 |

Laboratory Foaming

A conventional commercial poly(oxyethylene/oxypropylene)polyol initiated with o-TDA and having a hydroxyl/NH value of 460 (Desmophen® TP.PU 1907, Bayer AG) was used as an aromatic amino polyol (AP) in the comparison experiments. A conventional commercial propoxylated Mannich base based on nonylphenol having a hydroxyl value of 480 and a functionality of about 4 (Hoopol® M-120, Hoocker SA) was used as a Mannich polyol (MP).

Conventional commercial polymeric MDI (Desmodur 44V20L, Bayer AG) was used as a polymeric isocyanate.

Polyol A contained 54.8% by weight of an aromatic polyester polyol with a number average molecular weight of 375 g/mol, 23.1% by weight of a mixture of organic phosphates (Levagard® TTP64, Bayer AG), 3.1% by weight foam stabilizer (Tegostab® B8450, Goldschmidt AG), 0.5% by weight water, 12% by weight glycerine, 5.1% by weight of a bromine-containing hydroxyl functional component having a hydroxyl value of 335 and a functionality of 3 (Ixol®, Solvay AG), 0.6% by weight of a water-selective activator (Niax® A1) and 0.4% by weight of dibutyl tin anthranilate.

Polyol B contained 64.2% by weight of an aromatic polyester polyol having a number average molecular weight of 375 g/mol, 21.5% by weight trischloropropyl phosphate (Levagard® PP, Bayer AG), 1.5% by weight foam stabilizer (Tegostab® B8455, Goldschmidt AG), 0.2% by weight Desmorapid PV® (predominantly pentamethyl diethylene triamine), 1.1% by weight water and 11.5% by weight ethoxylated trimethanol propane with a number average molecular weight of about 700 g/mol.

| Example | V1 | V2 | 1 | 2 | 3 | 4 |
|---|---|---|---|---|---|---|
| Polyol A [% by weight] | 65.6 | 65.6 | 65.6 | 65.6 | 65.6 | 65.6 |
| AP 11% by weight] | 27.0 | | | | | |
| MP [% by weight] | | 27.0 | | | | |
| BM6 [% by weight] | | | 27.0 | | | |
| BM5 [% by weight] | | | | 27.0 | | |

-continued

| | | | | | | |
|---|---|---|---|---|---|---|
| BM3 [% by weight] | | | | | 27.0 | |
| BM4 [% by weight] | | | | | | 27.0 |
| Cyclopentane [% by weight] | 7.4 | 7.4 | 7.4 | 7.4 | 7.4 | 7.4 |
| After 2 h, cyclopentane is | emulsified | separated | completely dissolved | completely dissolved | completely dissolved | |
| Polyol mixture [vol. %] | 50 | 50 | 50 | 50 | 50 | 50 |
| Desmodur[12 ® 44V20L [vol. %] | 50 | 50 | 50 | 50 | 50 | 50 |
| Stirring time[s] | 8 | 8 | 8 | 8 | 8 | 8 |
| Cream time[s] | 15 | 15 | 11 | 13 | 13 | 13 |
| Fiber times | 29 | 29 | 21 | 24 | 24 | 24 |
| Free density [kg/m³] | 42 | 43 | 45 | 45 | 44 | 43 |
| Surface | tough | tough | tough | tough | tough | tough |
| Flame height to DIN 4102 Flame application to edge [cm] | 19–20 | 19–20 | 14–16 | 14–15 | 16–17 | 15–16 |
| Flame height to DIN 4102 Flame application to face [cm] | 19–20 | 19–20 | 14–16 | 15–16 | 16–17 | 15–18 |
| Destroyed sample length to DIN 4102 Flame application to edge [cm] | 11–12 | 11–11.5 | 9 | 9 | 10 | 9–10 |
| Destroyed sample length to DIN 4102 Flame application to face [cm] | 11–12.5 | 11–12 | 10–11 | 10–11 | 11–12 | 10–11 |

| Example | V3 | |
|---|---|---|
| Polyol B [% by weight] | 70 | 70 |
| MP [% by weight] | 22 | |
| BM6 [% by weight] | | 22 |
| n-pentane/HFC245 fa 2:1 [% by weight] | 8 | 8 |
| Polyol mixture [% by weight] | 32.5 | 32.5 |
| 25% potassium acetate in diethylene [% glycol by weight] | 2.6 | 2.6 |
| Desmodur ® 44V20L [11% by weight] | 64.9 | 64.9 |
| Index (100 × mol NCO/mol OH) | 305 | 305 |
| Stirring timer [s] | 10 | 10 |
| Cream time [s] | 18 | 12 |
| Fiber time [s] | 25 | |
| Curing time [s] | 44 | 28 |
| Free density [kg/m³ | 58 | |
| Surface | tough | tough |
| Flame height to DIN 4102 Flame application to edge [cm] | 9–10 | 8–9 |
| Destroyed length to DIN 4102 Flame application to edge [cm] | 5–6 | 5–6 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A rigid polyurethane foam obtained by reacting
   a) an isocyanate group-containing component, with
   b) a component having a flashpoint according to DIN EN 22719 below 55° C., comprising
      b1) at least one substance which is inert toward an isocyanate, does not have an ozone-destroying effect, and has a boiling point below 100° C.,
      b2) a reaction product of at least one compound having an aromatic ring, at least one aldehyde or ketone and at least one primary or secondary amine,
      b3) optionally, at least one isocyanate-reactive component which contains polyester groups,
      b4) optionally, at least one compound which is capable of reacting with the isocyanate and does not correspond to component b2 or b3, and
      b5) optionally, at least one additive required for the production of a foam.

2. A polyol formulation having a flash point to DIN EN 22719 below 55° C., comprising
   b1) at least one substance which is inert toward an isocyanate, does not have an ozone-destroying effect, and has a boiling point below 100° C.,
   b2) a reaction product of at least one compound with an aromatic ring, at least one aldehyde and/or ketone and at least one primary or secondary amine,
   b3) optionally, at least one isocyanate-reactive component which contains polyester groups,
   b4) optionally, at least one compound which is capable of reacting with the isocyanate and does not correspond to components b2 or b3, b5) optionally, one or more additives required for the production of foams.

3. The polyol formulation of claim 2 in which component b) comprises up to about 40% by weight of b1), from about 5 to about 70% by weight of b2), from about 5 to about 80% by weight of b3), and from 0 to about 60% by weight of b4).

4. The polyol formulation of claim 2 in which component b) comprises from about 3 to about 20% by weight of b1), from about 10 to about 30% by weight of b2), from about 10 to about 60% by weight of b3), and from 0 to about 25% by weight of b4).

* * * * *